(12) United States Patent
Lee et al.

(10) Patent No.: US 6,466,561 B1
(45) Date of Patent: Oct. 15, 2002

(54) METHOD AND APPARATUS FOR ESTIMATING POWER IN CDMA SYSTEM

(75) Inventors: Young Jo Lee, Seoul (KR); Hyung Uk Kwon, Seoul (KR); Young Sik Youn, Seoul (KR); Nam Suk Kim, Anyang-Shi (KR); Young Woo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/224,742

(22) Filed: Dec. 31, 1998

(30) Foreign Application Priority Data

Jun. 1, 1998 (KR) .............................. 98-20283

(51) Int. Cl.$^7$ .............................................. H04B 7/216
(52) U.S. Cl. ....................... 370/335; 370/209; 375/145
(58) Field of Search ................................. 370/208, 209, 370/230, 441, 479, 203, 249, 335, 342, 320; 375/130, 137, 246, 253, 140, 145, 206, 208, 367, 209, 320, 335, 334

(56) References Cited

U.S. PATENT DOCUMENTS

| | | | | |
|---|---|---|---|---|
| 5,450,453 A | * | 9/1995 | Frank | .......................... 375/200 |
| 5,822,359 A | * | 10/1998 | Bruckert et al. | ............. 375/200 |
| 5,930,230 A | * | 7/1999 | Odenwalder et al. | ........ 370/208 |
| 5,991,262 A | * | 11/1999 | Laird et al. | .................. 370/209 |
| 6,067,315 A | * | 5/2000 | Sandin | ........................ 375/206 |

* cited by examiner

Primary Examiner—Ricky Ngo
Assistant Examiner—Phuc Tran
(74) Attorney, Agent, or Firm—McKenna Long & Aldridge LLP

(57) ABSTRACT

The present invention relates to a mobile communication system, particularly relates to a power estimating apparatus of CDMA(code division multiple access) system which performs a power control of a down link or an up link in the CDMA mobile communication system and performs a power control about a CDMA signal by using an extended walsh code.

A power estimating method in a CDMA system for distinguishing CDMA channels with a walsh code which is orthogonal to all CDMA channels, comprising the steps of making an extended walsh code having a new format, which is orthogonal to all CDMA channels, by extending a length-(code stream) of the walsh code which is used for distinguishing the CDMA channels, according to a walsh function, and estimating a receiving power by correlating a receiving signal with the extended walsh code.

13 Claims, 3 Drawing Sheets

METHOD AND APPARATUS FOR ESTIMATING POWER IN CDMA SYSTEM

BACKGROUND

1. Technical Field

The present invention relates to a mobile communication system, and particularly relates to an apparatus and method for estimating power in a CDMA(code division multiple access) system which performs a power control of a down link or an up link in the CDMA mobile communication system and performs a power control about a CDMA signal by using an extended walsh code.

2. Description of the Prior Art

In a mobile communication system using a CDMA, such as a cellular mobile communication system or a personal communication service system, a plurality of mobile stations send/receive frames through a base station or a cell-site, in which the frame comprises symbols indicating a digitized voice or other data.

The transmission frames are affected by a fading through multipath. The fading effect relates to a transmission environment characteristic which reflects the transmission frames in accordance that a mobile station moves, and also relates to a coherence of other mobile station or other base station. At this time, the coherence is caused by a high transmitting power of a certain channel of a mobile station or a certain the base station.

In case of using a too low transmitting power, it may happen to lose the data because it is impossible to release the data of the transmitted frame. accordingly, a base station or a mobile station minimizes a fading or coherence through the multipath and controls a frame transmitting power for releasing the transmitted data safely at the same time.

By the reason as explained above, the system sends a power control command in order to regulate the transmitting power through respective separated channels by measuring the transmitting power from the frame which is transmitted between the base station and the mobile station.

The power control command is a transmitting power increment bit or a transmitting power decrement bit for maintaining an average value of a received power.

FIG. 1 shows a schematic diagram of a mobile communication system by using the CDMA in a prior art. Referring to FIG. 1, a PSTN(Public Switched Telephone Network) is a communication networks for a telephone subscriber provided by a communication network provider. It comprises a mobile switching center and a wire transmission line which performs a line exchange between the subscribers and a repeat call process in order that the mobile communication subscriber may communicate with other mobile communication subscriber or a wire network subscriber by using a mobile communication service.

Additionally, a base station controller 12 controls a power control by using an error rate of the received frame, and thereby generates a power control command in order that a mobile station 13 may send/receive the data by using a proper transmitting power through a base station A 14A or a base station B 14B.

Here, the power control command is a power control increment bit or a power control decrement bit having 1 to 2 bits of each frame.

FIG. 2 shows a schematic block diagram of an up link power controller of CDMA mobile communication system in a prior art.

Referring to FIG. 2, a CDMA signal of a spread spectrum sent from a mobile station, is received to a receiving antenna 20 of a base station through a CDMA channel and the received CDMA signal passes a down frequency process in a high frequency receiving unit 21.

The CDMA signal, which is processed as the down frequency in the high frequency receiving unit 21, is converted to a digital signal in an A/D converter 22. A PN correlating unit 23 correlates the converted CDMA signal, by using a PN code, which is provided from a PN code generator(not shown in figure).

An output of the PN correlating unit 23 is provided to a decoder 24 for decoding and also provided to a power estimator 25 for estimating an average receiving power of a mobile station, in which the mobile station has sent the CDMA signal.

The decoder 24 decodes a code symbol about the received CDMA signal and provides a code error metrics to an external loop power controller 26, in which the code error metrics indicates a quality of the CDMA signal.

Accordingly, the external loop power controller 26 may recognize a sufficient transmitting power for sending the data by a mobile station(not shown in figure), and provides a power control reference value for using in the power control of an up link(a link from the mobile station to the base station), to a comparator 27.

The comparator 27 compares the average value of the mobile station receiving power which is estimated from the power estimator 25, and the power control reference value which is provided from the external loop power controller 26 and provides a deviation of the receiving power average value about the power control reference value to a power control bit generator 28.

The power control bit generator 28 provides a received power increment bit or a received power decrement bit according to the provided deviation, to a sending unit 29.

The sending unit 29 sends the received power increment bit or the received power decrement bit which is outputted from the power control bit generator 28, as well as a user data which is processed with an up frequency, to a mobile station through a sending antenna 30.

And then the mobile station regulates a receiving power according to the received power increment/decrement command and sends the user data at a transmitting speed in accordance with the regulated power.

The system controls a power control through the power estimator 25, the comparator 27, and the power control bit generator 28 as a closed loop power control. The closed loop power control is established after the base station measures a receiving power in accordance with a transmitting speed of the signal, which is received from the mobile station. And also the base station sends a proper power control command as well as the user data to the mobile station by comparing the received power with the power control reference value, in which the power reference value is predetermined in each base station. Thereby, the power control is performed by sending a signal as the regulated transmitting power in accordance with the power control command which is sent by the mobile station.

When performing the closed loop power control, the power control reference value is set according to several parameters, such as a moving speed of the mobile station, environment of the mobile station, and etc., in which the power control reference value is different from each mobile station. The base station controller properly regulates the power control reference value according to a receiving data frame error rate through the external loop power controller 40. The power control described above, is so called the outer loop power control.

The power control of the CDMA mobile communication in a prior art is usually applied to the up link. When performing a power control of a down link(a link from a base station to a terminal), it is required to measure a coherent rate about the CDMA signal which is received from the base station and as well as calculate a signal to a coherent rate after determining the transmitting speed of the currently received signal from the mobile station, because traffic channel of the down link has a variable transmitting power according to a transmitting speed after looking into the traffic channel which is similar to the power control. Therefore, it may happen that the delay of the transmission speed is larger when performing the power control. In other words, the delay of the transmitting speed can not follow a current variable CDMA channel environment When the power control bit for the up link power control is sent through the traffic channel, the power control bit has a same power about all transmitting speed regardless of the sending speed. Therefore, it is possible to perform the power control by looking into the power control bit, which is transmitted through the previous traffic channel. However, an error may largely generated and thereby there are more possibility that the power control is to be wrong when calculating the coherent rate about the current received CDMA signal because the power control bit has a very short length.

In case of performing the power control by looking into a pilot channel besides the traffic channel, the previous pilot channel is used by the plurality of mobile stations which are involved in a signal base station. Accordingly, it is impossible to calculate a signal to coherent rate of the certain mobile station which performs the power control in the CDMA signal which is received from the plurality of mobile stations.

To solve the above problems it has been proposed to use the traffic channel and the pilot channel for controlling the receiving power.

All power control technology explained above depends on an ability of an estimator of estimating the receiving signal.

Here, the receiving signal comprises the receiving signal of a certain mobile station and a receiving signal of another mobile station, which uses an orthogonal code, which is different from each other. Accordingly, there is problem that an exact power control is difficult without dividing the receiving signal of other mobile station, which has coherence with a receiving signal of a particular mobile station, among the receiving signals of any channel.

SUMMARY

Accordingly, in order to solve the problems in the prior art it is an object of the present invention to provide a method and apparatus for estimating power in CDMA system by using an extended orthogonal code which is extended according to a walsh function for an exact power control.

In order to achieve the above object in accordance with an embodiment of the present invention, there is provided a power estimating method in a CDMA system for distinguishing CDMA channels with a walsh code which is orthogonal to all CDMA channels, having the steps of making an extended walsh code having a new format, which is orthogonal to all CDMA channels, by extending a length (code stream) of the walsh code which is used for distinguishing the CDMA channels, according to a walsh function; and estimating a receiving power by correlating a receiving signal with the extended walsh code.

In addition the power estimating method can have a step of estimating a noise power in the receiving power by using a correlated value about the extended walsh code.

In order to achieve the above object in accordance with the present invention, there can be provided a power estimating apparatus in a CDMA system for distinguishing CDMA channels with a walsh code, including a extended walsh code correlating unit for extending a length (code stream) of the walsh code, used in distinguishing the CDMA channels, according to a walsh function in order to estimate a noise power included in a receiving signal, for making an extended walsh code having a new format, which is orthogonal to all CDMA channels, and for correlating the receiving signal with the extended walsh code, in which the receiving power is estimated with a correlating value of the extended walsh code.

The power estimating apparatus in a CDMA system can further include a traffic channel correlating unit of correlating a code symbol received through a traffic channel, and of outputting a correlating value in accordance with the correlated code symbol; a pilot channel correlating unit of correlating a code symbol received through a pilot channel, and outputting a correlating value in accordance with the correlated code symbol; and a power estimating unit of estimating an average value of the receiving power by using the correlating value of the extended walsh code correlating unit and the correlating values of the traffic channel correlating unit and the pilot channel correlating unit.

For obtaining the above object, in the power estimating apparatus and method in a CDMA system, the extended walsh code can be comprised by connecting a plurality of walsh codes successively.

In addition, the extended walsh code is comprised of walsh codes having different polarities from each other.

For accomplishing the above object, there can be provided the power estimating apparatus and method in a CDMA system, in which, when a vector of the extended walsh code is $W_M$, a received signal vector $r_M(n)$ is $$r_M(n) = A_n W_M + Z_M(n)$$

where $A_n$ is a gain of a receiving channel, and $Z_M(n)$ is a noise vector at a moment of time nMT (T: walsh code length interval, M: number of the extended walsh code), and in which a correlating value $y_l(n)$ which correlates the receiving $$y_l(n) = MNA_n + u_p(n)$$

signal with the extended walsh code, is where MN is an overall length of the extended walsh code, and $u_p(n)$ is a white noise vector, and in which a noise power which is estimated from above formulas, is $$E_1(n) = E\left[\left|\frac{y_1(n)}{MN}\right|^2\right] = \hat{\sigma}^2$$

Moreover, the present invention can provide the power estimating apparatus and method in a CDMA system, in which, when a walsh code vector which is allocated in the pilot channel is $W_p$, a received signal vector $r(n)$ is $$r(n) = S_n A_n W_p + Z(n)$$

where $A_n$ is a gain of a receiving channel, and $Z(n)$ is a noise vector at a moment of time nT (T: walsh code length interval), in which a correlating value $y_p(n)$ which correlates the receiving signal with an allocated walsh code on the pilot $$y_p(n) = NA_n + u_p(n)$$

channel, is where N is a length of the walsh code, and $u_p(n)$ is a white noise vector, and in which the overall receiving power which is estimated from the above formulas, is and in which a power which estimated from the received signal, is $$\hat{A}_n^2 = E_p(n) - \hat{\sigma}_n^2$$

BRIEF DESCRIPTION

Other objects, features and advantages of the present invention will become more apparent from the following detailed description when read in conjunction with the accompanying drawings, in which.

DETAILED DESCRIPTION OF THE PREFERRED EMBODIMENTS

Embodiments of the invention will be described with reference to the accompanying drawing.

Figure 1:
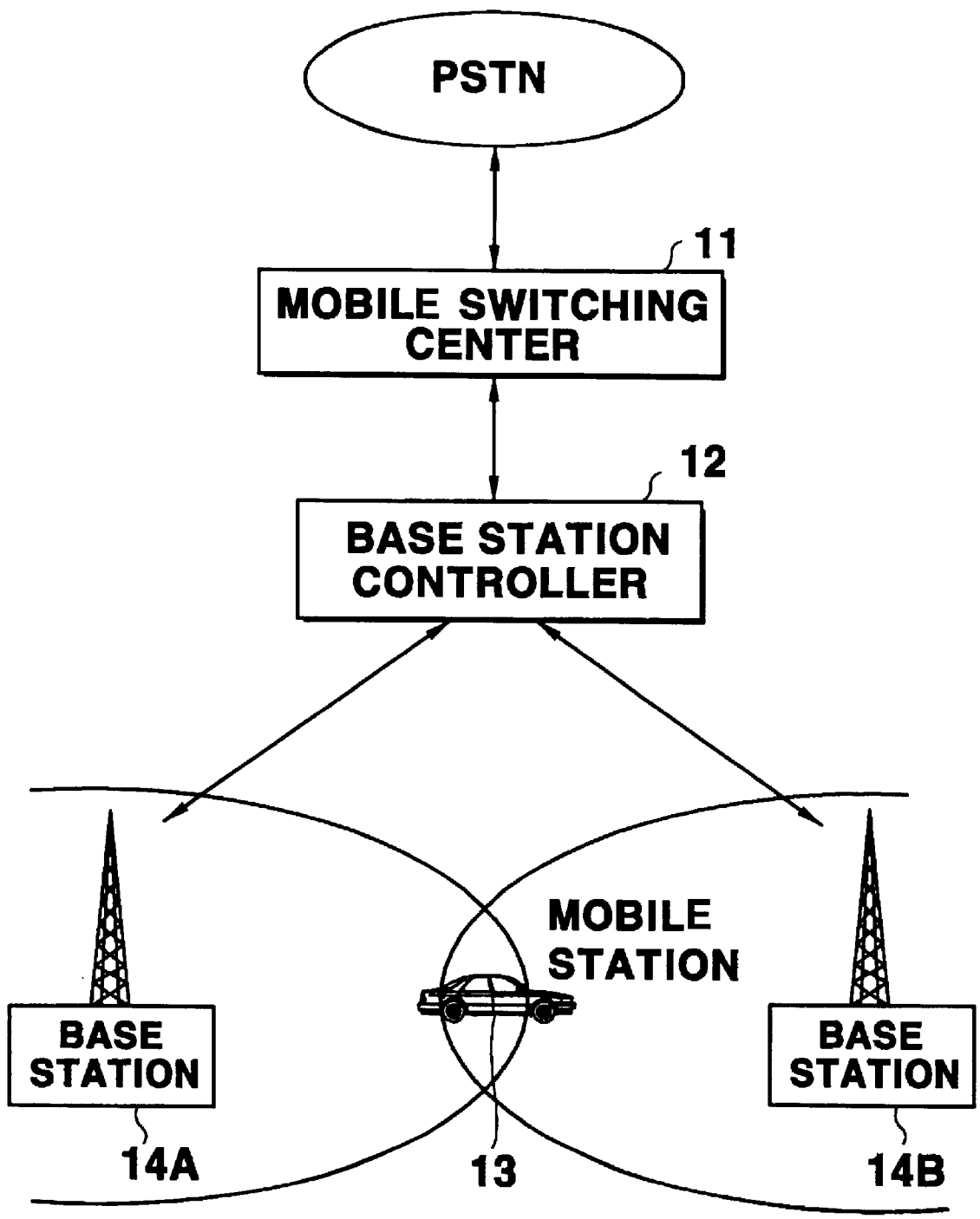
FIG. 1 shows a schematic diagram of a mobile communication system by using the CDMA in a prior art.
Figure 2:
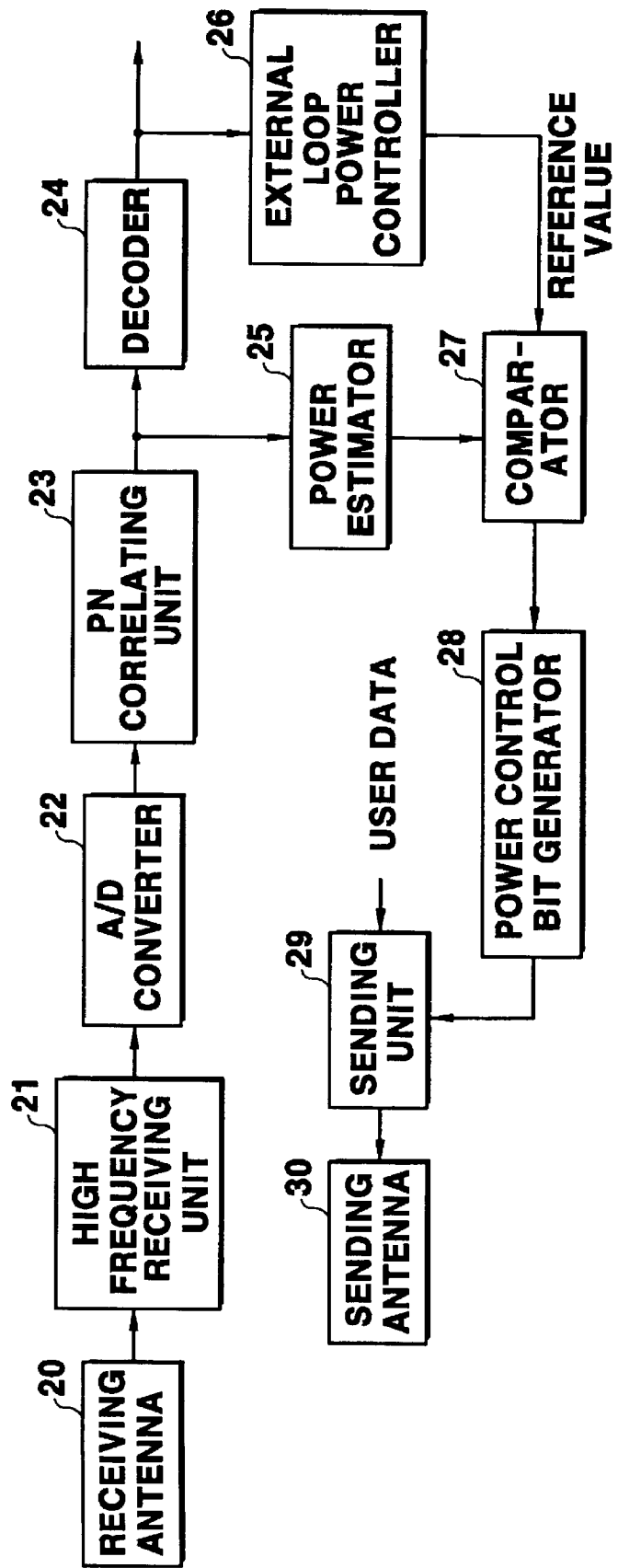
FIG. 2 shows a schematic block diagram of an up link power controller of a CDMA mobile communication system in a prior art.
Figure 3:
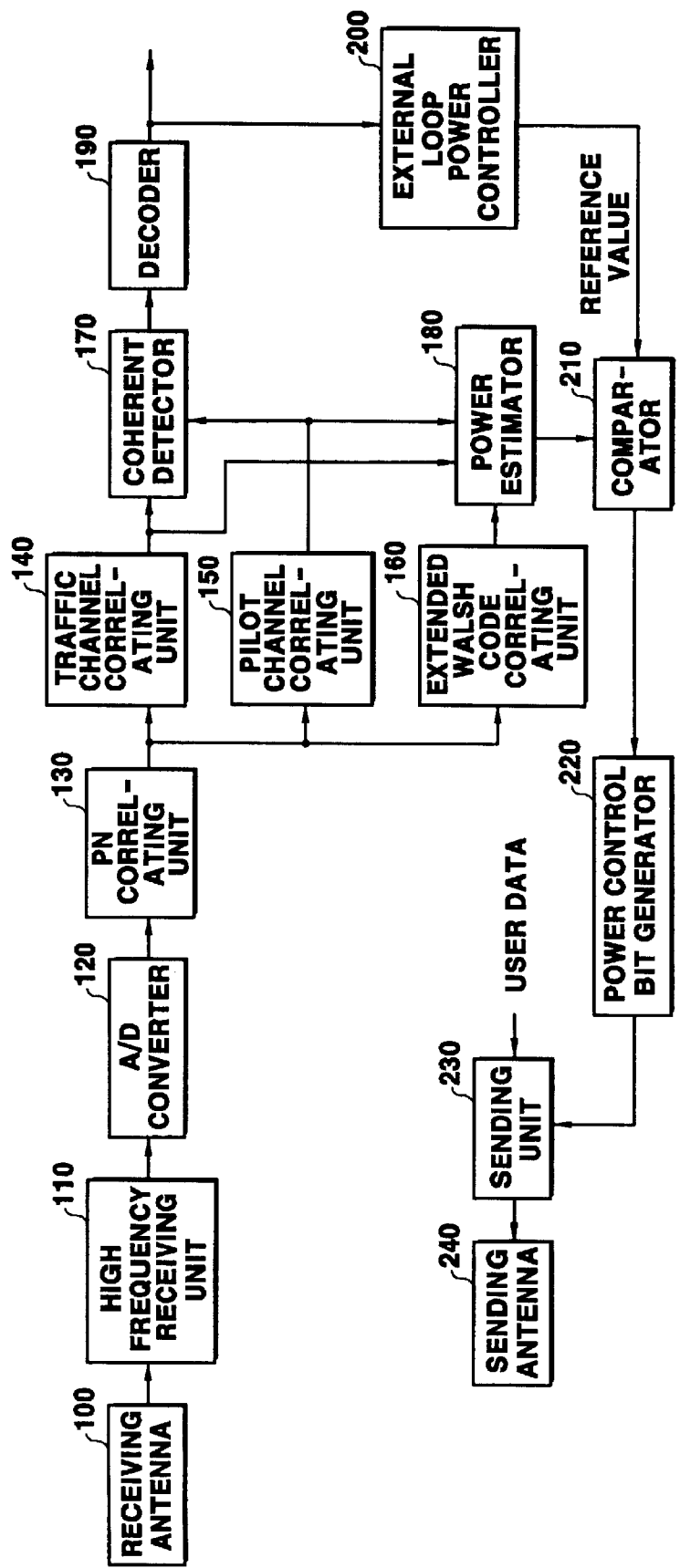
FIG. 3 shows a schematic block diagram about a power controller of a CDMA mobile communication system in accordance with an embodiment of the present invention.

FIG. 3 shows a schematic block diagram about a power controller of a CDMA mobile communication system in accordance with an embodiment of the present invention.

The power controller of the CDMA mobile communication system according to the present invention comprises a traffic channel correlating unit 140 of correlating a code symbol received among the CDMA signals through a traffic channel. The power controller further includes a pilot channel correlating unit 150 of correlating a code symbol received among the CDMA signals through a pilot channel. In addition, the power controller includes an extended walsh code correlating unit 160 of extending a code stream and of outputting a correlation value in accordance with the extended code stream. And the power controller comprises a coherent detector 170 of detecting a code symbol which will be decoded from the output of the traffic channel correlation unit 140 and the output of the pilot channel correlating unit 150. The power controller also includes a power estimator 180 of estimating an average receiving power of the mobile station from the output of the traffic channel correlating unit 140, the output of the pilot channel correlating unit 150, and the output of the extended walsh code correlating unit 160.

Now it will be explained about an operation and effect of the present invention.

The CDMA signal of a spread spectrum which is sent from the mobile station or the base station, is received from a receiving antenna 100 of the base station or of the mobile station through the CDMA channel. And the received CDMA signal passes an up frequency process in a high frequency receiving unit 110.

Here, the CDMA signal, which is through the CDMA channel, uses a walsh function and is symbolized by an orthogonal pair of a PN order with a fixed chip rate.

The CDMA signal, which is processed as the down frequency in the high frequency receiving unit 110, is converted to a digital signal in the A/D converter 120. The PN correlating unit 130 correlates a previous converted CDMA signal by using the PN code, which is provided from the PN code generator.

After correlating the previous converted CDMA signal in the PN correlating unit 130, a code symbol on a traffic channel which is coded, takes a correlating process in the traffic channel correlating unit 140. Additionally, a code symbol on a pilot channel, which is coded, takes a correlating process in the pilot channel correlating unit 150 by using the walsh function.

The pilot channel correlating unit 150 correlates the receiving signal as much as a walsh code length about the walsh code which is allocated on the pilot channel.

The extended walsh code correlating unit 160 generates an extended walsh code from an inputted code symbol. The extended walsh code has a relation with all of other walsh codes orthogonally. It is possible to calculate an estimated receiving signal power as desired, by calculating a noise power estimating value, which is received by using the extended walsh code.

The output of the traffic channel correlating unit 140, the output of the pilot channel correlating unit 150 and the output of the extended walsh code correlating unit 160 are provided to the power estimator 180. The power estimator 180 uses these outputs and thereby it may be capable of estimating the receiving power of the mobile station or the base station, which sends the CDMA signal.

The coherent detector 170 detects a receiving code symbol which will be decoded, in the output of the traffic channel correlating unit 140 and the output of the pilot channel correlating unit 150. And the decoder 190 decodes the previous detected code symbol.

The external loop power controller 200 is received a code error metrics which indicates a quality of the CDMA signal received from the decoder 190. And the external loop power controller 200 calculates a sufficient transmitting power for sending the signal by the mobile station or the base station which sends the CDMA signal by using the code error metrics. And the external loop power controller 200 decides the previous calculated transmitting power as a power control reference value, which will be used for the power control. The previous decided power control reference value is provided to the comparator 210. And the comparator 210 compares a receiving power of the mobile station or the base station with the power control reference value, which is provided from the external loop power controller 200, in which the receiving power is estimated in the power estimator 180. The comparator 210 then outputs a deviation of a receiving power average value about the power control reference value, to the power control bit generator 220.

The power control bit generator 220 outputs a receiving power increment bit or a receiving power decrement bit according to the deviation of the receiving power average value about the power control reference value, to the sending unit 230. The sending unit 230 sends the user data which is processed as the up frequency and the receiving power increment/decrement bit which is outputted from the power control bit generator 220, to the mobile station or the base station through the sending antenna 240.

Accordingly, the mobile station or the base station regulates the receiving power according to the receiving power increment/decrement command and sends the user data in accordance with the regulated transmitting speed.

Now it will be explained how to estimate an exact receiving power from the extended walsh code correlating unit 160 by using the walsh code, when the power controller generates the extended walsh code in accordance with the present invention.

It is assumed that a walsh code vector of the pilot channel about the receiving signal r(t) is Wp and a walsh code interval having a length 'N' is T. A signal vector r(t) which is received at the moment of a time nT is:

$$r(n) = S_n A_n W_p + Z(n) \qquad \text{formula 1}$$

Here, Sn is a sending information through the pilot channel, An is a gain of the pilot channel, and Z(n) is a noise vector at a moment of a time nT.

Generally, Sn is always "1", the formula 1 is transformed to:

$$r(n)=A_n W_p+Z(n) \quad \text{formula 2}$$

Additionally, an output of the pilot channel correlating unit 150 is:

$$y_p(n)=NA_n+u_p(n) \quad \text{formula 3}$$

Here, $u_p(n)$ is a white noise vector.

In case that the white noise vector has a zero average, an expected value $$E_p(n) = E\left[\left|\frac{y_p(n)}{N}\right|^2\right] = A_n^2 + \sigma_n^2 \quad \text{formula 4}$$

$E_p(n)$ about a square of $y_p(n)$ which is scaled with 1/N is, where, $\sigma_n^2$ is a power or a deviation of $u_p(n)/N$ and $A_n^2$ power of the user receiving signal which is desired among the decoded signals. To calculate the value $A_n^2$, the value $\sigma_n^2$ should be calculated. And to calculate the value $\sigma_n^2$, there should be a walsh code of other user channel and another walsh code of maintaining the walsh code orthogonally as well as the pilot channel.

Now it will be explained how to generate another walsh code which is orthogonally maintained with the walsh code of the other user channel. Another walsh code for measuring the noise is generated by extending the walsh code length, and therefore it is possible to maintain number of the walsh code which has been used.

The extended walsh code uses the walsh code $W_i^N$ of the other user's walsh code which may be now used. Here i is an index number of the walsh code and N is the walsh code length.

The extended walsh code is made by connecting the walsh code $W_i^N$ having M successively. Here the M is a value having an exponent of 2, and a polarity of the Walsh code $W_i^N$ is repeatedly changed when connecting the M successively.

For example, when M is 2, the extended walsh code is $W_i^N \overline{W_i^N}$. And, when M is 4, the external walsh code can be $W_i^N \overline{W_i^N} W_i^N \overline{W_i^N}$, $W_i^N W_i^N \overline{W_i^N} \overline{W_i^N}$, $W_i^N \overline{W_i^N} \overline{W_i^N} W_i^N$.

The above extended walsh code has an orthogonal relation with the other walsh code $W_i^N (i \neq j)$.

When the error power is estimated by using the extended walsh code, the correlating length should be M times longer than the walsh code. Accordingly, a length of an input vector which is inputted to the extended walsh code correlating unit 160 should be M times longer.

When the extended walsh code is $W_M$, the received vector r(n) is $$r_M(n)=A_n W_M+Z_M(n) \quad \text{formula 5}$$

where, the $Z_M(n)$ is a noise vector at a moment of nMT, and An is a channel gain.

For example, when M is 2, the received signal vector r(n) is $$r_2(n)=A_n[W_p \overline{W_p}]+Z_2(n) \quad \text{formula 6}$$

An output value of the extended walsh code correlating unit 160 in accordance with the formula 6 is $$y_l(n)=MNA_n+u_p(n) \quad \text{formula 7}$$

where, the $u_p(n)$ is a white noise vector.

$$E_1(n) = E\left[\left|\frac{y_1(n)}{MN}\right|^2\right] = \hat{\sigma}^2. \quad \text{formula 8}$$

Additionally, an expected value $E_l(n)$ of a square of which is scaled with 1/MN is now explained. A result of the formula 8 is a deviation of the noise which is estimated at the time n, the deviation is a value which is calculated with the previous time MN.

The estimated power $A_n^2$ of the desired signal among the received signal is $$A_n^2 = E_p(n) - \hat{\sigma}_n^2 \quad \text{formula 9}$$

Because the noise power estimating value of the formula 6 is calculated by using the extended walsh code, the correlating length should be M times longer. Therefore, it may be capable of controlling the power control when the desired signal power and the noise power are estimated.

There is an advantage that the exact power control is possible because the receiving power of the receiving signal may be exactly estimated without limiting number of channels by maintaining all CDMA channels orthogonally and by using the extended walsh code for estimating the received noise power.

The present invention is not limited to the specifically disclosed embodiments, and variations and modifications may be made without departing from the scope of the present invention.

What is claimed is:

1. A power estimating method in a Code Division Multiple Access (CDMA) system for distinguishing CDMA channels with a Walsh code which is orthogonal to all CDMA channels, comprising:

generating an additional extended code having a new format which is orthogonal to all CDMA channels by extending a length of the Walsh code, which is used for distinguishing CDMA channels, according to a Walsh function; and estimating a receiving power by correlating a receiving signal with the additional extended code.

2. The power estimating method in a CDMA system according to claim 1, further comprising estimating a noise power included in the receiving power by using a correlated value about the extended walsh code.

3. The power estimating method in a CDMA system according to claim 1, wherein the extended walsh code is formatted by connecting a plurality of walsh codes successively.

4. The power estimating method in a CDMA system according to claim 3, wherein the extended walsh code is formatted of walsh codes having different polarity from each other.

5. The power estimating method in a CDMA system according to claim 2, wherein, when a vector of the extended walsh code is $W_M$, a received signal vector $r_M(n)$ is $$r_M(n)=A_n W_M+Z_M(n)$$

where $A_n$ is a gain of a receiving channel, and $Z_M(n)$ is a noise vector at a moment of time nMT (T: walsh code length interval, M: number of the extended walsh code), wherein a correlating value $y_l(n)$ which correlates the receiving signal with the extended walsh code, is $$y_l(n)=MNA_n+u_p(n)$$

where MN is an overall length of the extended walsh code, and $u_p(n)$ is a white noise vector, and wherein a noise power $U_p(n)$ which is estimated from above formulas, is $$E_1(n) = E\left[\left|\frac{y_1(n)}{MN}\right|^2\right] = \hat{\sigma}^2.$$

6. The power estimating method in a CDMA system according to claim 5, wherein, when a walsh code vector which is allocated in a pilot channel is $W_p$, a received signal vector r(n) is $$r(n)=S_n A_n W_p + Z(n)$$

where $A_n$ is a gain of a receiving channel, and Z(n) is a noise vector at a moment of time nT (T: walsh code length interval), wherein a correlating value $y_p(n)$ which correlates the receiving signal with an allocated walsh code on the pilot channel, is $$y_p(n) = NA_n + u_p(n)$$

where N is a length of the walsh code, and $u_p(n)$ is a white noise vector, wherein the overall receiving power which is estimated from the above formulas, is $$E_p(n) = E\left[\left|\frac{y_p(n)}{N}\right|^2\right] = A_n^2 + \sigma_n^2$$

wherein a power $\hat{A}_n^2$ which estimated from the received signal, is $$\hat{A}_n^2 = E_p(n) - \hat{\sigma}_n^2.$$

7. A power estimating apparatus in a CDMA system for distinguishing CDMA channels with a walsh code which is orthogonal to all CDMA channels, comprising:

extended walsh code correlating means for extending a length (code stream) of the walsh code, used in distinguishing the CDMA channels, according to a walsh function in order to estimate a noise power included in a receiving signal, for making an extended Walsh code having a new format, which is orthogonal to all CDMA channels, and for correlating the receiving signal with the extended walsh code, wherein the receiving power is estimated with a correlating value of the extended walsh code.

8. The power estimating apparatus in a CDMA system according to claim 7, further comprising, traffic channel correlating means of correlating a code symbol received through a traffic channel, and of outputting a correlating value in accordance with the correlated code symbol, pilot channel correlating means of correlating a code symbol received through a pilot channel, and outputting a correlating value in accordance with the correlated code symbol, and power estimating means of estimating an average value of the receiving power by using the correlating value of the extended walsh code correlating means, the correlating value of the traffic channel correlating means and the correlating value of the pilot channel correlating means.

9. The power estimating apparatus in a CDMA system according to claim 8, wherein the extended walsh code is formatted by connecting a plurality of walsh codes successively.

10. The power estimating apparatus in a CDMA system according to claim 9, wherein the extended walsh code is formatted of the walsh codes having different polarity from each other.

11. The power estimating method in a CDMA system according to claim 9, wherein, when a vector of the extended walsh code is $W_M$, a received signal vector $r_M(n)$ is $$r_M(n) = A_n W_M + Z_M(n)$$

where $A_n$ is a gain of a receiving channel, and $Z_M(n)$ is a noise vector at a moment of time nMT (T: walsh code length interval, M: number of the extended walsh code), wherein a correlating value $y_f(n)$ which correlates the receiving signal with the extended walsh code, is $$y_f(n) = MNA_n + u_p(n)$$

where MN is an overall length of the extended walsh code, and $u_p(n)$ is a white noise vector, and wherein a noise power which is estimated from above formulas, is $$E_1(n) = E\left[\left|\frac{y_1(n)}{MN}\right|^2\right] = \hat{\sigma}^2.$$

12. The power estimating method in a CDMA system according to claim 11, wherein, when a walsh code vector which is allocated in the pilot channel is $W_p$, a received signal vector r(n) is $$r(n)=S_n A_n W_p + Z(n)$$

where $A_n$ is a gain of a receiving channel, and Z(n) is a noise vector at a moment of time nT (T: walsh code length interval), wherein a correlating value $y_p(n)$ which correlates the receiving signal with an allocated walsh code on the pilot channel, is $$y_p(n) = NA_n + u_p(n)$$

where N is a length of the walsh code, and $u_p(n)$ is a white noise vector, wherein the overall receiving power which is estimated from the above formulas, is $$E_p(n) = E\left[\left|\frac{y_p(n)}{N}\right|^2\right] = A_n^2 + \sigma_n^2$$

wherein a power $A_n^2$ which estimated from the received signal, is $$\hat{A}_n^2 = E_p(n) - \hat{\sigma}_n^2.$$

13. A power estimating method in a Code Division Multiple Access (CDMA) system for distinguishing CDMA channels with a Walsh code which is orthogonal to all CDMA channels, comprising:

generating an additional extended code having a new format which is orthogonal to all CDMA channels by extending a length of the Walsh code which is used for distinguishing CDMA channels, according to a Walsh function, estimating a traffic channel by using a ratio of a traffic channel to a pilot channel for a predetermined time; and estimating a noise power of a receiving power by correlating a receiving signal with the additional extended code.

* * * * *